US008060815B2

(12) United States Patent
Voslow

(10) Patent No.: US 8,060,815 B2
(45) Date of Patent: Nov. 15, 2011

(54) CUSTOM DOCUMENT GENERATION SYSTEM AND METHOD

(75) Inventor: Rich Voslow, Seattle, WA (US)

(73) Assignee: Variable Maps, Inc., Seattle, WA (US)

( * ) Notice: Subject to any disclaimer, the term of this patent is extended or adjusted under 35 U.S.C. 154(b) by 977 days.

(21) Appl. No.: 11/929,686

(22) Filed: Oct. 30, 2007

(65) Prior Publication Data

US 2008/0065981 A1    Mar. 13, 2008

Related U.S. Application Data

(63) Continuation-in-part of application No. 11/828,968, filed on Jul. 26, 2007, now abandoned.

(60) Provisional application No. 60/820,936, filed on Jul. 31, 2006.

(51) Int. Cl.
 *G06F 17/00* (2006.01)
(52) U.S. Cl. ............................. 715/201; 715/200
(58) Field of Classification Search ............ 715/200, 715/255–256, 271–276, 201; 705/2, 10, 705/14.1, 14.11–14.14, 14.4, 14.67
See application file for complete search history.

(56) References Cited

U.S. PATENT DOCUMENTS

| | | | |
|---|---|---|---|
| 5,029,902 A * | 7/1991 | Komori | 283/56 |
| 6,014,629 A * | 1/2000 | DeBruin-Ashton | 705/2 |
| 7,865,306 B2 * | 1/2011 | Mays | 701/211 |
| 2001/0009331 A1 * | 7/2001 | Zorn | 283/98 |
| 2002/0046089 A1 * | 4/2002 | Zorn | 705/14 |
| 2003/0002081 A1 * | 1/2003 | Leone et al. | 358/1.18 |
| 2003/0206311 A1 * | 11/2003 | Konsella et al. | 358/1.14 |
| 2004/0073538 A1 * | 4/2004 | Leishman et al. | 707/3 |
| 2005/0159974 A1 * | 7/2005 | Moss et al. | 705/1 |
| 2007/0219712 A1 * | 9/2007 | Abhyanker | 701/208 |
| 2008/0046298 A1 * | 2/2008 | Ben-Yehuda et al. | 705/6 |
| 2008/0097840 A1 * | 4/2008 | Lesniak | 705/14 |

OTHER PUBLICATIONS

"Carrier Route Maps Radius Mapping & More" captured from www.dietrich-direct.com on May 26, 2006 on Internet Archive Wayback Machine, p. 1-4.*

* cited by examiner

*Primary Examiner* — Amelia Rutledge
(74) *Attorney, Agent, or Firm* — AEON Law; Adam L. K. Philipp

(57) ABSTRACT

A custom marketing document system and method, including custom map information, is provided herein.

6 Claims, 10 Drawing Sheets

CUSTOM DOCUMENT GENERATION SYSTEM AND METHOD

RELATED REFERENCES

This application is a continuation-in-part of U.S. patent application Ser. No. 11/828,968, filed Jul. 26, 2007, which is a nonprovisional application of U.S. Provisional Application No. 60/820,936, filed Jul. 31, 2006. The contents of both applications are incorporated herein by reference in their entirety.

FIELD

The present invention relates to generating custom documents. More particularly, it refers to generating personalized documents having a custom map appropriate to the locations of a particular prospective customer and a particular business branch.

BACKGROUND

Conventional printed marketing materials that are sent to customers generally contain static marketing information and possibly some customized text information. For example, printed marketing information may take the form of letters, cards and/or brochures that include a customer's name, address or other textual information about a customer. Similarly some forms of online advertising allow for customers to request dynamic information once they have received online marketing materials. For example, if a user receives an electronic invitation from "Evite" from IAC/InterActiveCorp of New York, N.Y., there may be a link to obtain a map from a specified online mapping provider to an event associated with the Evite. Generally the maps that are available online from online mapping providers such as MapQuest of Denver, Colo., do not provide a high enough quality map for printed materials.

Additionally, communication networks are well known in the computer communications field. By definition, a network is a group of computers and associated devices that are connected by communications facilities or links. Network communications can be of a permanent nature, such as via cables, or can be of a temporary nature, such as connections made through telephone or wireless links. Networks may vary in size, from a local area network ("LAN"), consisting of a few computers or workstations and related devices, to a wide area network ("WAN"), which interconnects computers and LANs that are geographically dispersed, to a remote access service, which interconnects remote computers via temporary communication links. An inter-network, in turn, is the joining of multiple computer networks, both similar and dissimilar, by means of gateways or routers that facilitate data transfer and conversion from various networks. A well-known abbreviation for the term inter-network is "internet." As currently understood, the capitalized term "Internet" refers to the collection of networks and routers that use the Internet Protocol ("IP"), along with higher-level protocols, such as the Transmission Control Protocol ("TCP") or the Uniform Datagram Packet ("UDP") protocol, to communicate with one another.

Existing marketing methods are not as effective as they could be regarding customized marketing to local individuals. It is common to get direct marketing materials with a cursory level of personalization, such as an ad with one's name printed onto an otherwise generic document. It is also not uncommon to receive marketing materials that include a map showing the location or locations of a business in a city or region. However existing methods do now allow for locally targeted personalized marketing materials that not only indicate the location or locations of the branches of a business that are closest to each targeted prospective customer, but that may also indicate a custom travel route between each individual prospective customer and a nearby branch (or branches).

DETAILED DESCRIPTION

Figure 1:
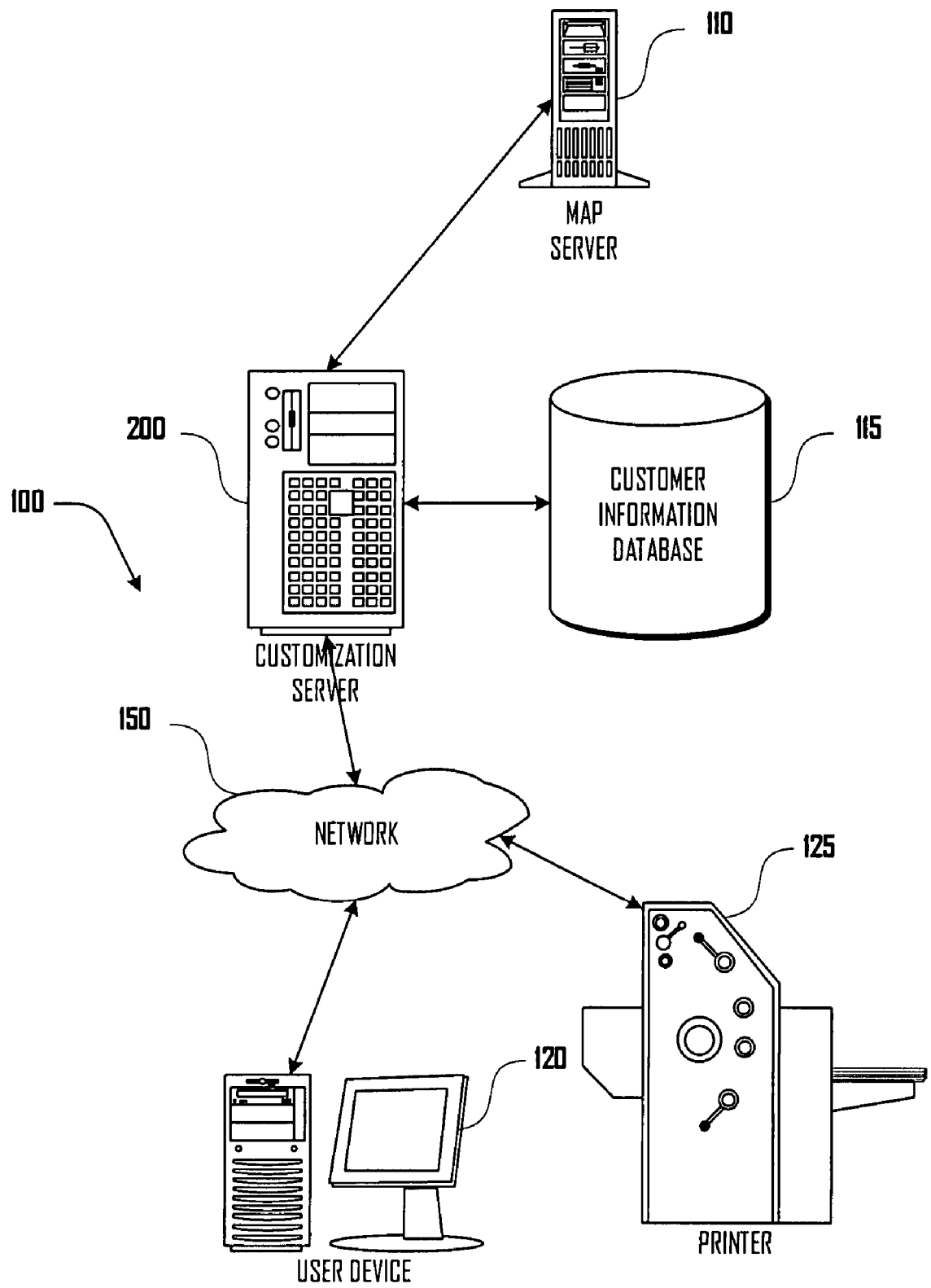
FIG. 1 illustrates an exemplary Custom Document Generation System in accordance with one embodiment.

The detailed description that follows is represented largely in terms of processes and symbolic representations of operations by conventional computer components, including a processor, memory storage devices for the processor, connected display devices and input devices. Furthermore, these processes and operations may utilize conventional computer components in a heterogeneous distributed computing environment, including remote file Servers, computer Servers and memory storage devices. Each of these conventional distributed computing components is accessible by the processor via a communication network.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. Those of ordinary skill in the art will appreciate that other embodiments, including additional devices, or combinations of illustrated devices, may be added to, or combined, without limiting the scope to the embodiments disclosed herein.

In the description that follows, the terms customer, desired customer, prospective customer, prospect, and similar terms are used interchangeably to refer to entities to whom a business may wish to deliver targeted, customized marketing materials.

FIG. 1 illustrates an exemplary Custom Document Generation System 100 having a number of devices used in exemplary embodiments. FIG. 1 illustrates a Printer 125 (such as a variable data printing press) connected via a Network 150 User Device 120 and a Customization Server 200, illustrated in FIG. 2 and described below. Also included are a Map Server 110 and a Customer Information Database 115.

In alternate embodiments, there may be a plurality of Map Servers 110, or even that the role of the Map Server 110 may be performed by another device such as the Customization Server 200. In further embodiments, still additional devices (not shown) may be utilized in the Custom Document Generation System 100. For example, the Customer Information Database 115 may be located on a separate device than the Customization Server 200. Likewise, in some embodiments, other devices (both shown and not shown) may be combined. For example, the Printer 125 and User Device 120 may be merged into a single device.

Figure 2:
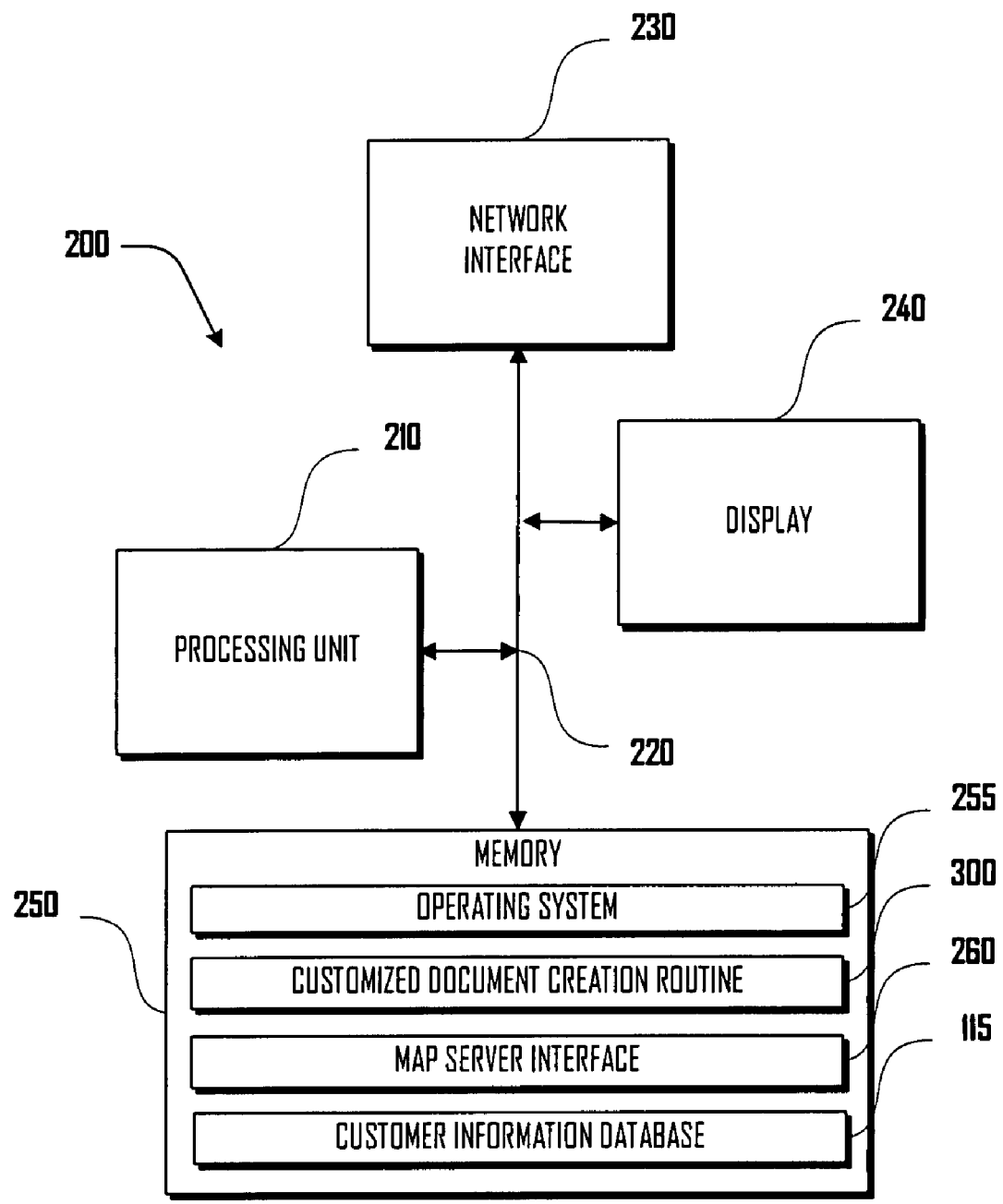
FIG. 2 illustrates an exemplary Customization Server in accordance with one embodiment.

An example listing of Variable Data Printing Presses suitable for use in various embodiments includes, but is not limited to:

Xeikon 5000 series presses
Océ VarioPrint series presses
Xerox DocuColor series presses
Xanté's lumina series presses
Canon ImagePRESS and ImageRunner Pro series presses
Kodak NexPress and Digimaster series presses
HP Indigo series presses
MGI Digital Graphic Technology Meteor DP 40 series presses FIG. 2 illustrates several of the components of the Customization Server 200. In some embodiments, the Customization Server 200 may include many more components than those shown in FIG. 2. However, it is not necessary that all of these generally conventional components be shown in order to disclose an illustrative embodiment. As shown in FIG. 2, the Customization Server 200 includes a Network Interface 230 for connecting to other devices in the Custom Document Generation System 100. In various embodiments, the Network Interface 230 includes the necessary circuitry for such a connection and is constructed for use with the appropriate protocol.

The Customization Server 200 also includes a Processing Unit 210, a Memory 250 and may include a Display 240, all interconnected along with the network interface 230 via a Bus 220. The Memory 250 generally comprises a random access memory ("RAM"), a read only memory ("ROM"), and a permanent mass storage device, such as a disk drive. The Memory 250 stores the program code necessary for a Customized Document Creation Routine 300, a Map Server Interface 260, and possibly a Customer Information Database 115. In addition, the Memory 250 also stores an Operating System 255. It will be appreciated that these software components may be loaded from a computer readable medium into Memory 250 of the Customization Server 200 using a drive mechanism (not shown) associated with a computer readable medium, such as a floppy disc, tape, DVD/CD-ROM drive or via the Network Interface 230.

Although an exemplary Customization Server 200 has been described that generally conforms to conventional general purpose computing devices, those of ordinary skill in the art will appreciate that a Customization Server 200 may be of any great number of devices capable of communicating with the device within the Custom Document Generation system 100.

Figure 3:
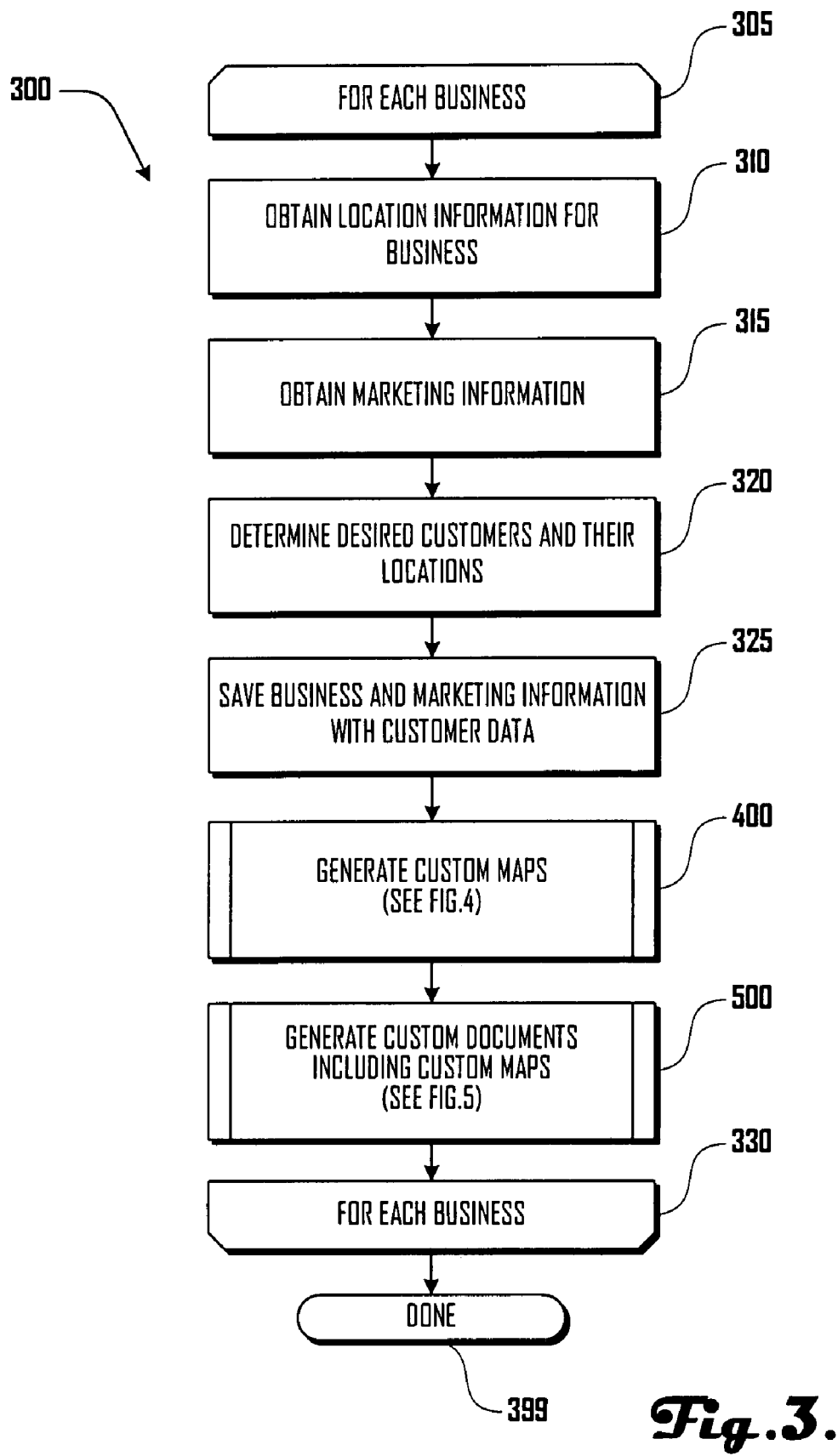
FIG. 3 illustrates a Customized Document Creation Routine in accordance with one embodiment.

FIG. 3 illustrates an exemplary Customized Document Creation Routine 300. Customized Document Creation Routine 300 is used to create documents that have dynamic marketing information that is targeted to a specific customer and/or customer address. Such targeted, personalized marketing materials may be desirable for any business that markets to customers from areas immediately surrounding its location or branch locations. Examples of such businesses include automobile dealerships and repair facilities, restaurants, home improvement stores, grocery stores, video rental stores. In addition, in urban markets, as many as 70% or more consumers may bank within three miles of their home or office, and credit unions tend to undertake more localized marketing efforts than large national banks. So businesses that may utilize such targeted, personalized marketing materials also include local or regional banks and in an exemplary embodiment, credit unions.

Figure 7:
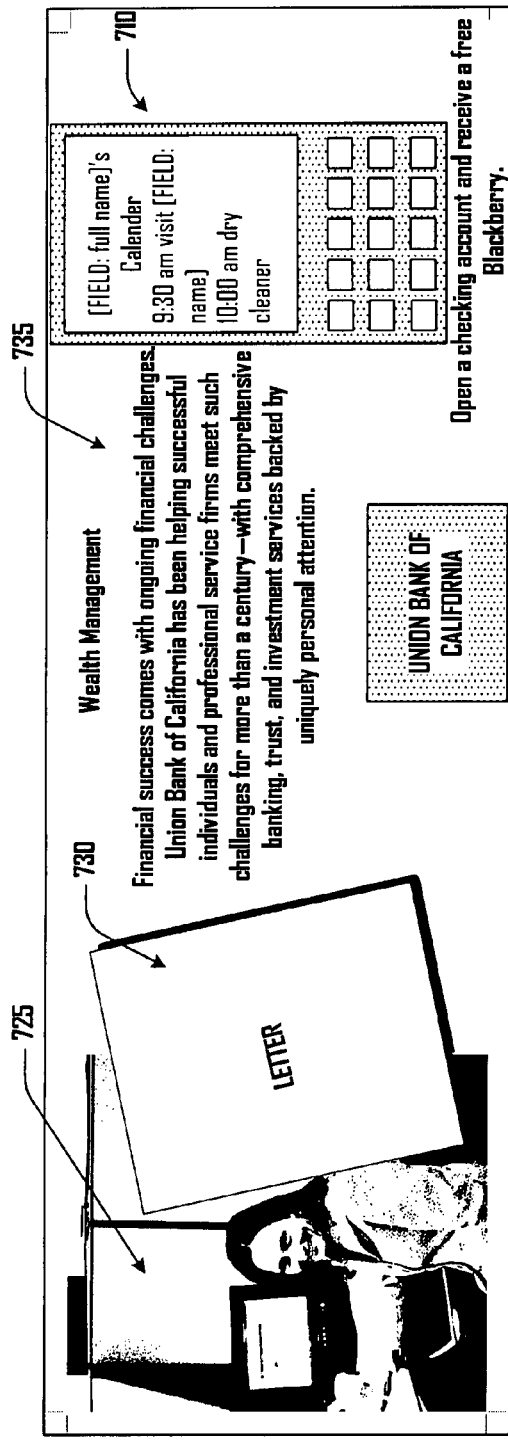
FIGS. 7a and 7b illustrate an exemplary Custom Marketing Document in accordance with one embodiment.

Customized Document Creation Routine 300 begins at looping block 305 which begins in iteration for each branch of a business for which marketing documents are being created. A business may wish to create targeted, personalized marketing materials as part of an ongoing marketing campaign, or a business may wish to create such materials because, for example, a new branch has opened in a neighborhood or because a local branch wants to invite local residents to a special event. Next, in block 310, Location Information is obtained for the business. In block 315, Marketing Information for the business is obtained. FIGS. 7a and 7b illustrate an exemplary Custom Marketing Document 700A and 700B that includes exemplary marketing information, including promotional textual and/or graphical information 710, a picture of a branch manager or other branch employee 725, a personalized message 730, other textual and/or graphical information 735, a logo 740, a picture of the branch and/or the branch entrance 745, the prospective customer's address 750, and a custom map 720 showing the locations of the prospective customer and the branch and/or a travel route between the two 722.

In block 320, desired customers and their locations are determined. In one exemplary embodiment determining desired customers and their locations includes querying a Customer Information Database 115 to locate customers or prospective customers within a region proximate to the location of the current business branch. In an exemplary embodiment, such prospects may be selected because they recently bought a home, moved into a residence, or otherwise relocated to within three miles of the business branch. In additional embodiments, determining desired customers may involve other processes, such as determining if a customer has already been designated as a desired customer at an alternate business and possibly making a determination as to which customers are better suited for a particular business location. In a further embodiment, Desired Customers 320 may have been predetermined such that a list of desired customers and their locations is available for each business.

Figure 4:
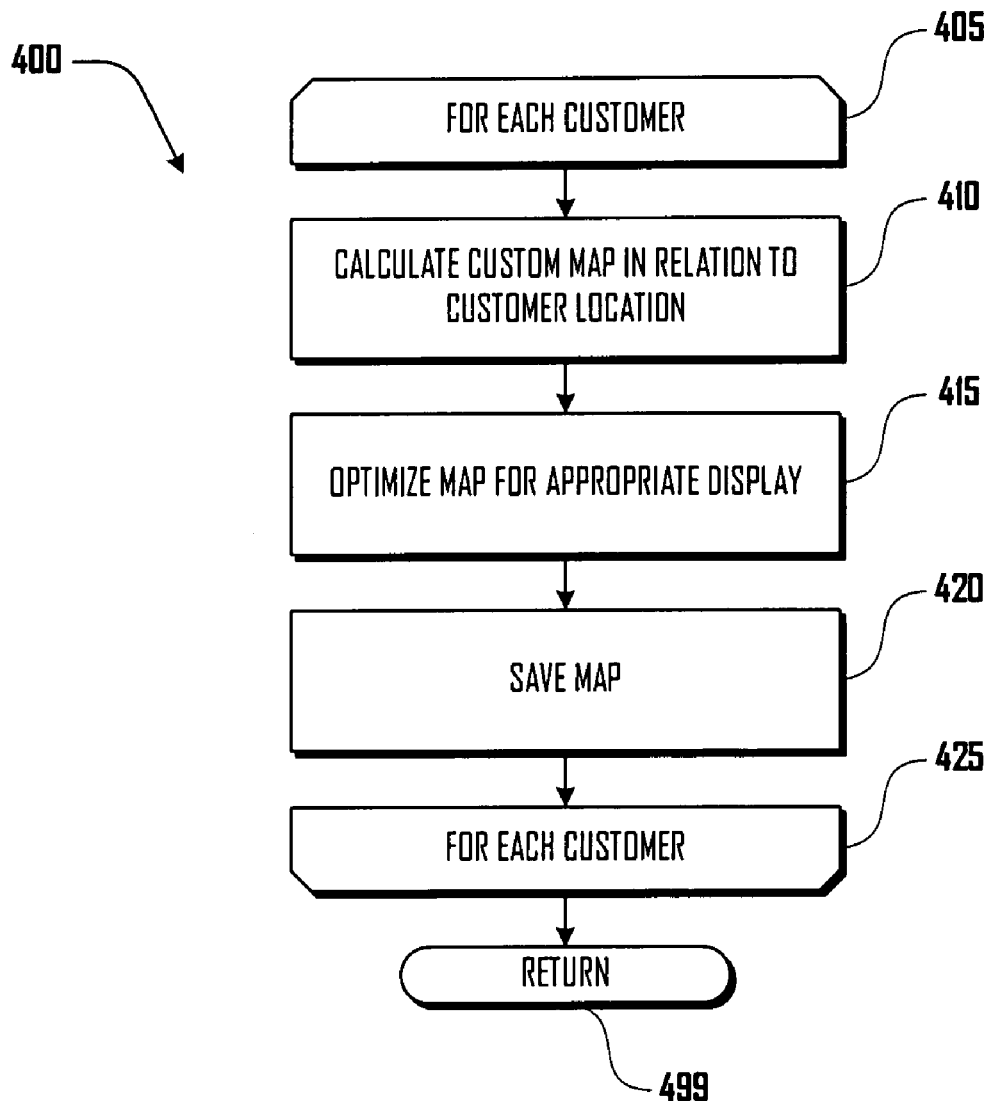
FIG. 4 illustrates a Custom Map Generation Sub-Routine in accordance with one embodiment.
Figure 5:
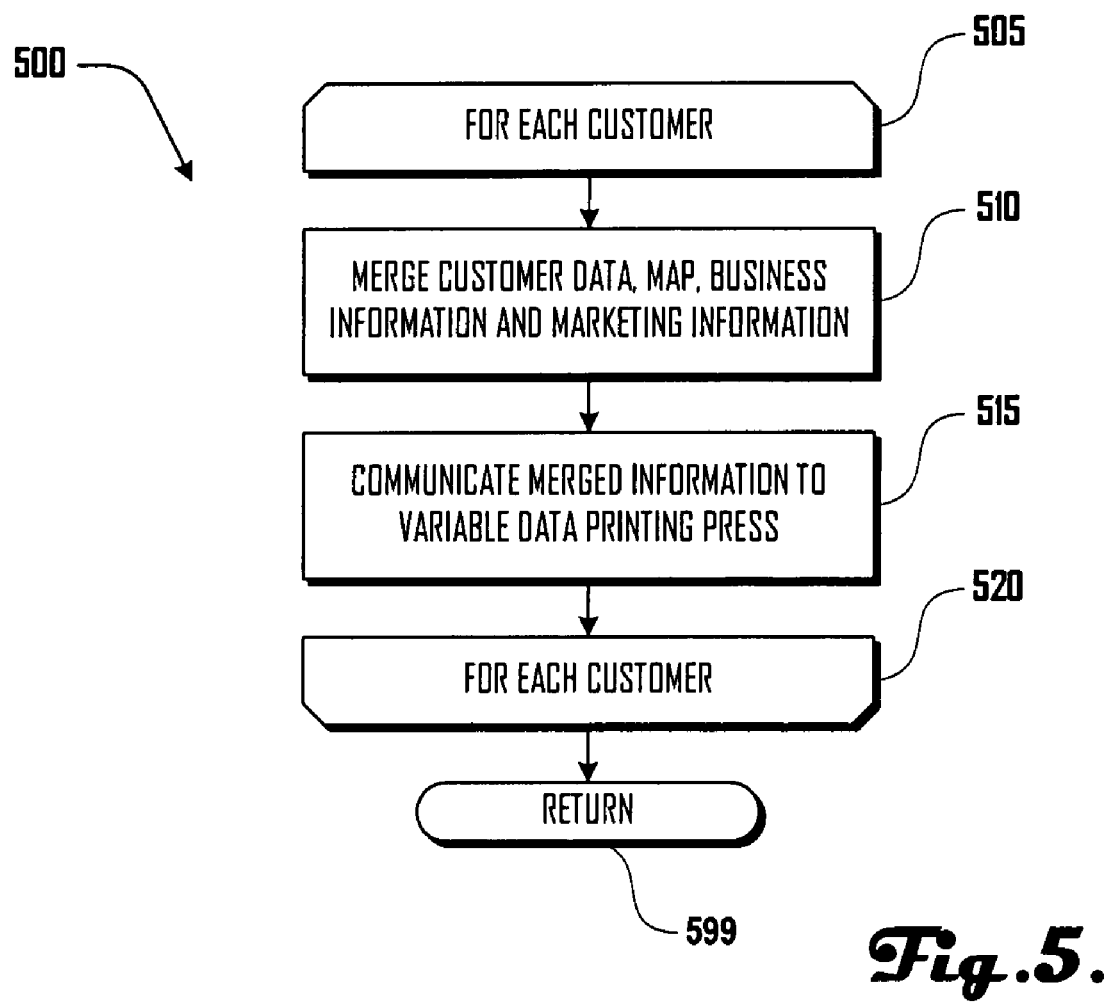
FIG. 5 illustrates a Custom Document Generation Sub-Routine in accordance with one embodiment.

In block 325, business and marketing information is saved with the customer data for use in creating customer-marketing documents as described below. Next in Custom Map Generation Sub-Routine 400, custom maps for each customer and business are generated. Custom Map Generation Sub-Routine 400 is illustrated in FIG. 4 and described below. Once a custom map has been generated, processing proceeds to Custom Document Generation Sub-Routine 500 where the custom marketing documents, including custom maps, are generated. (Custom Document Generation Sub-Routine 500 is illustrated in FIG. 5 and is described below.) Upon returning from Custom Documents Generation Sub-Routine 500, processing proceeds to looping block 330, which cycles back to looping block 305 until all businesses have been iterated through. Processing proceeds to block 399 where dynamic document creation routine 300 ends.

FIG. 4 illustrates an exemplary Custom Map Generation Sub-Routine 400. Custom Map Generation Sub-Routine 400 begins at block 405, which iterates through each provided customer. In block 410, a custom map is calculated in relation to the provided business branch and current customer location. In one exemplary embodiment, the custom map may simply indicate a location of the customer and a location of the business. In an alternate embodiment, the custom map may include a travel route between the customer location and the designated business. In another embodiment, a custom map may include travel routes to and/or the locations of more than a single branch such that a user may choose between a number of branch locations (e.g., those locations within three miles or other predetermined radius of the customer's location).

Next, in block 415, the calculated custom map is optimized for an appropriate display. In various embodiments, the display medium for the custom map is in a printed format. In such embodiments, if the custom map was originally calculated to be displayed on a lower resolution terminal device such as a computer monitor, optimizing the map for appropriate display may include adjusting the resolution of the custom map such that it would be suitable for printing at a higher resolution.

Alternately, the optimization for an appropriate display may include formatting and/or cropping of regions of a custom generated map that do not provide either customer, business or route information. In further embodiments, alternate display mediums other than printed technologies may be suitable when delivering custom document to a customer. For example, the custom map and its associated document may be rendered to an image file or other electronic document and delivered via email, the world wide web, or other electronic means.

In block 420, the custom map is saved. In one exemplary embodiment, the custom map is saved to a database (or other suitable data storage) along with the customer information (e.g., name, address, age, marital status, other demographic information and the like). In some embodiments, the saved customer information and custom maps may be reused in a subsequent document generation without having to recreate custom maps for each customer and business. However, in other embodiments, saving the custom map may only be a transient process to provide the Custom Document Generation Sub-Routine 500 with custom map information that may not be used thereafter.

After the custom map has been saved, processing proceeds to looping block 425 where processing cycles back to looping block 405 until each customer has been iterated through. Next, Custom Map Generation Sub-Routine 400 returns to its calling routine in Return 499.

FIG. 5 illustrates an exemplary Custom Document Generation Sub-Routine 500. Custom Document Generation Sub-Routine 500 begins at looping block 505 which iterates through each provided customer. In block 510, customer data, custom map, business information and marketing information are merged in a predetermined format (e.g., a Document Template 600) to create an electronic version of a Custom Marketing Document 700A and 700B as shown in FIG. 7*a-b*. In block 515, the merged information (i.e. the Custom Marketing Document 700 A and 700B) is communicated to an appropriate rendering/display device such as a variable data printing press or Printer 125 for rendering. Next, in looping block 520, processing cycles back to looping block 505 until each customer has been iterated through, after which processing proceeds to Return 599 which returns to the calling routine.

Figure 6:
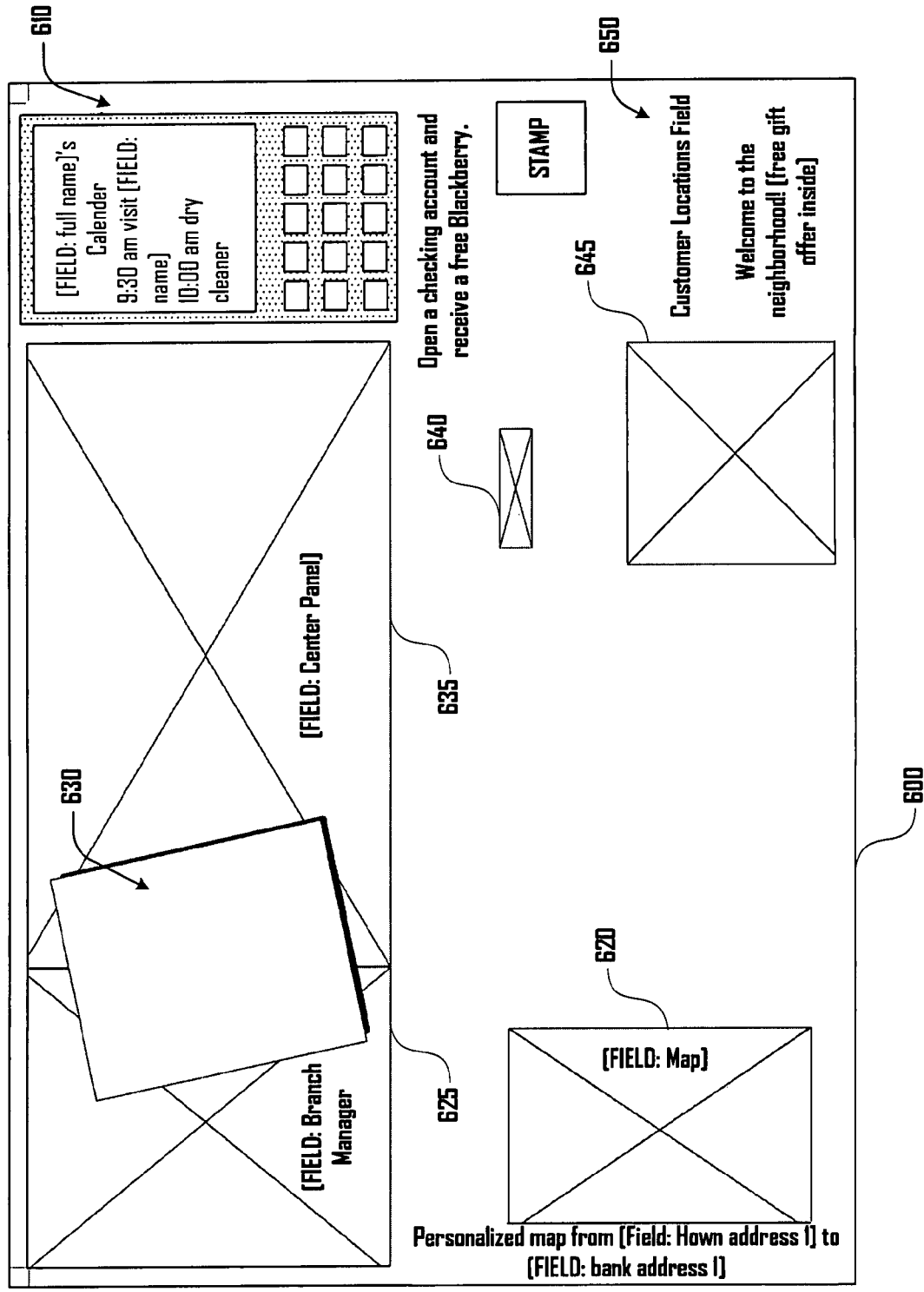
FIG. 6 illustrates an exemplary Custom Marketing Document Template in accordance with one embodiment.

FIG. 6 illustrates an exemplary Custom Marketing Document Template 600. Included in the Template 600 are a number of fields that may contain customized information. For example, Promotion Field 610 may include the ability to specify text within a graphical image. Marketing Field 630 may also include the ability to include text and/or graphical information (e.g., a signature). Similarly, a Logo Field 640, a Front Door Field 645 and a Branch Manager Field 625 may include suitable graphical marketing information. A Center Panel Field 635 may include graphical or textual information as appropriate. Also included of course is a location for a Custom Map Field 620 and Customer Locations Field 650.

FIG. 7*a-b* illustrates an exemplary Custom Marketing Document 700A and 700B that may be produced by a suitable template such as Template 600. As can be seen in FIG. 7*a-b*, on one side 700A an Image 725 has been included to provide graphical marketing information. Also included is customized textual and graphic information in a Letter 730 along with useful textual and logo information in a Center Panel 735. Similarly, the Promotion Information 710 has been customized with a customer's information and the business branch's information. Included in the Custom Map Panel 720 on the other side of Custom Marketing Document 700B is Route Information 722 between a customer location and a business location. As noted above, other Graphical Information 745 and Logo Information 740 are included along with customer Location Information 750 to allow delivery to a customer.

Figure 8:
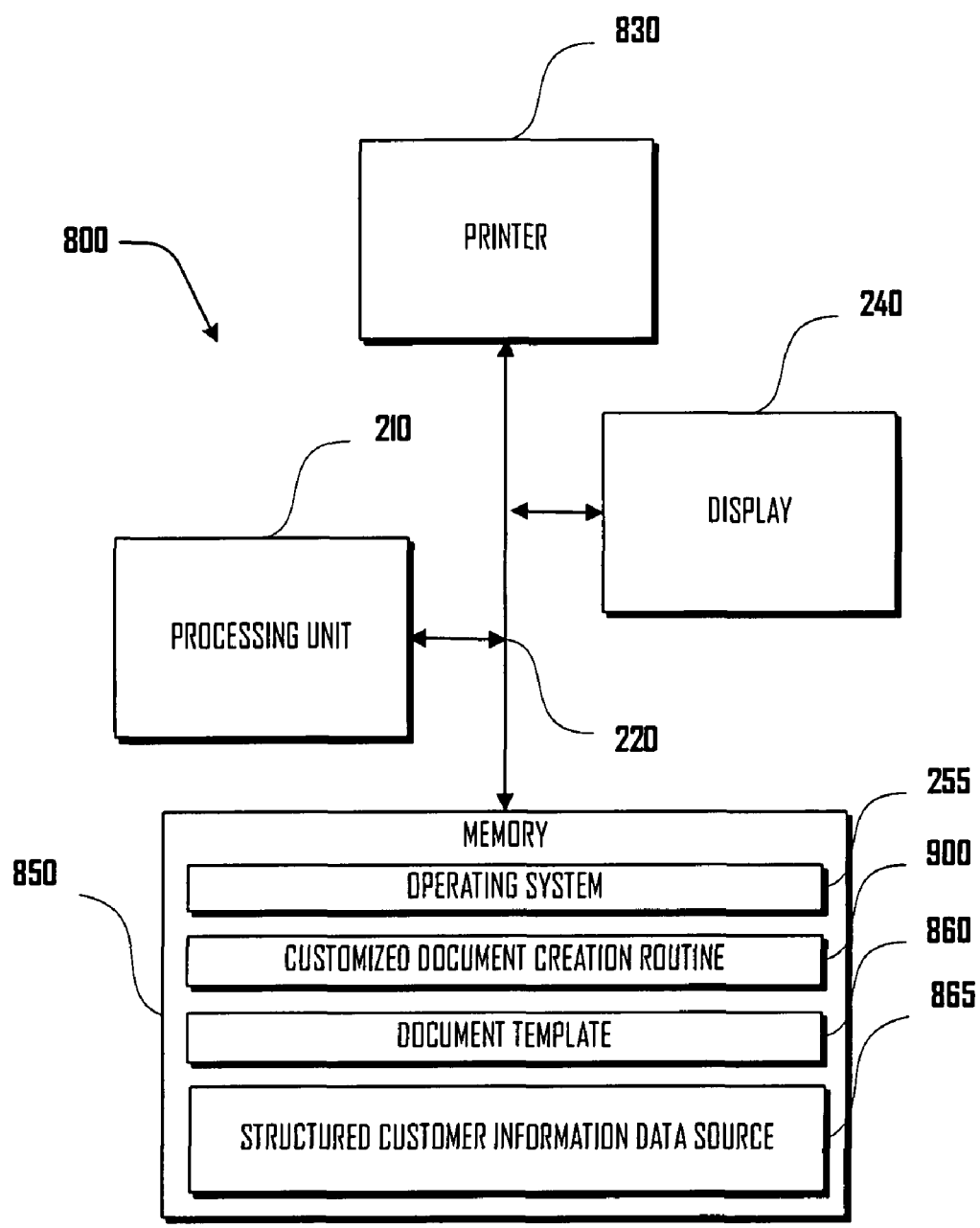
FIG. 8 illustrates several components of an exemplary custom-marketing-documents creating device in accordance with one embodiment.

In an alternate embodiment, custom marketing documents may be created using a personal computer 800, such as that illustrated in FIG. 8, in conjunction with a software program 900 that creates customer-specific maps as part of a mail merge operation. The resulting custom marketing documents may then be printed on any suitable printer 830 or rendered to some other medium that can be delivered to a customer. In alternate embodiments, the printer 830 may be connected via a network, or the printer 830 may be connected to a different computer altogether.

This alternate embodiment may be advantageous for those who, for whatever reason, cannot afford or do not wish to utilize an embodiment of a commercial system for creating custom marketing documents, as described above. For example, it may be appropriate to use the mail merge alternate embodiment to create invitations to parties, business events, seminars, or grand openings of a retail store.

Mail merge is a software function, well known in the art, that enables the production of multiple customized documents from a single fixed template 860 and a structured data source 865. This technique is typically used to create personalized letters and pre-addressed envelopes or mailing labels for mass mailings from a database mailing list of names and addresses. But with the proper software program, mail merge can also be used to create custom marketing documents incorporating customer-specific maps.

Figure 9:
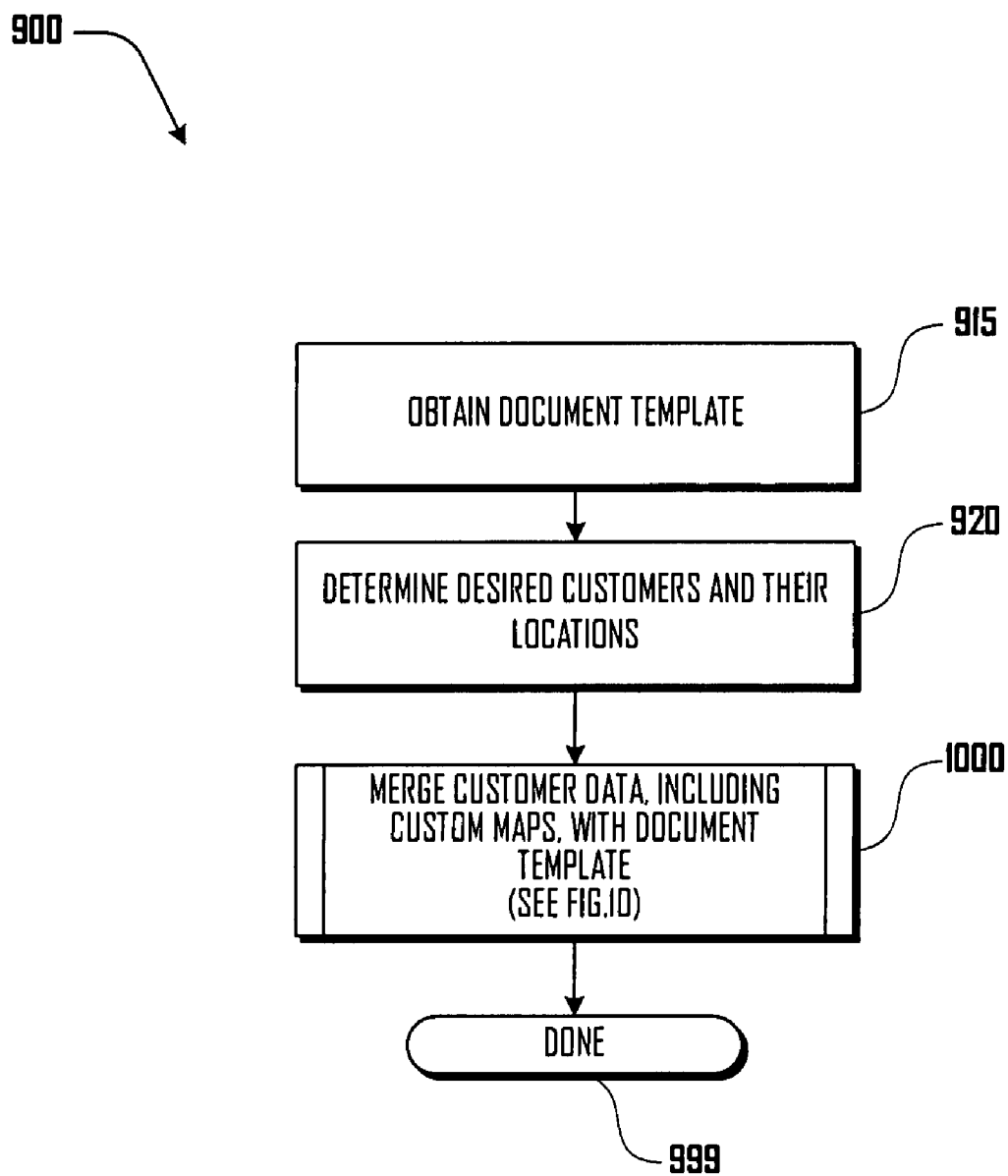
FIG. 9 illustrates a custom-marketing-documents creation routine in accordance with one embodiment.

In an exemplary embodiment, the procedure of creating custom marketing documents, illustrated in FIG. 9, is carried out using a word processing program. In block 915, a document template is obtained or created. In an exemplary embodiment, the template is a word processing document, similar to that illustrated in FIG. 6, that contains fixed text, placeholders for custom text, and one or more placeholders for custom maps. In block 920, desired customers are determined and are organized into a structured data source, such as a spreadsheet or a database having columns or fields that correspond to variables in the template. Aside from this organization into a data source suitable for use in a mail merge, block 920 is otherwise similar to block 320, described above. In the mail merge process, sub-routine 1000, the placeholders are replaced by text from the structured data source 865 and custom maps from a custom map generator.

Figure 10:
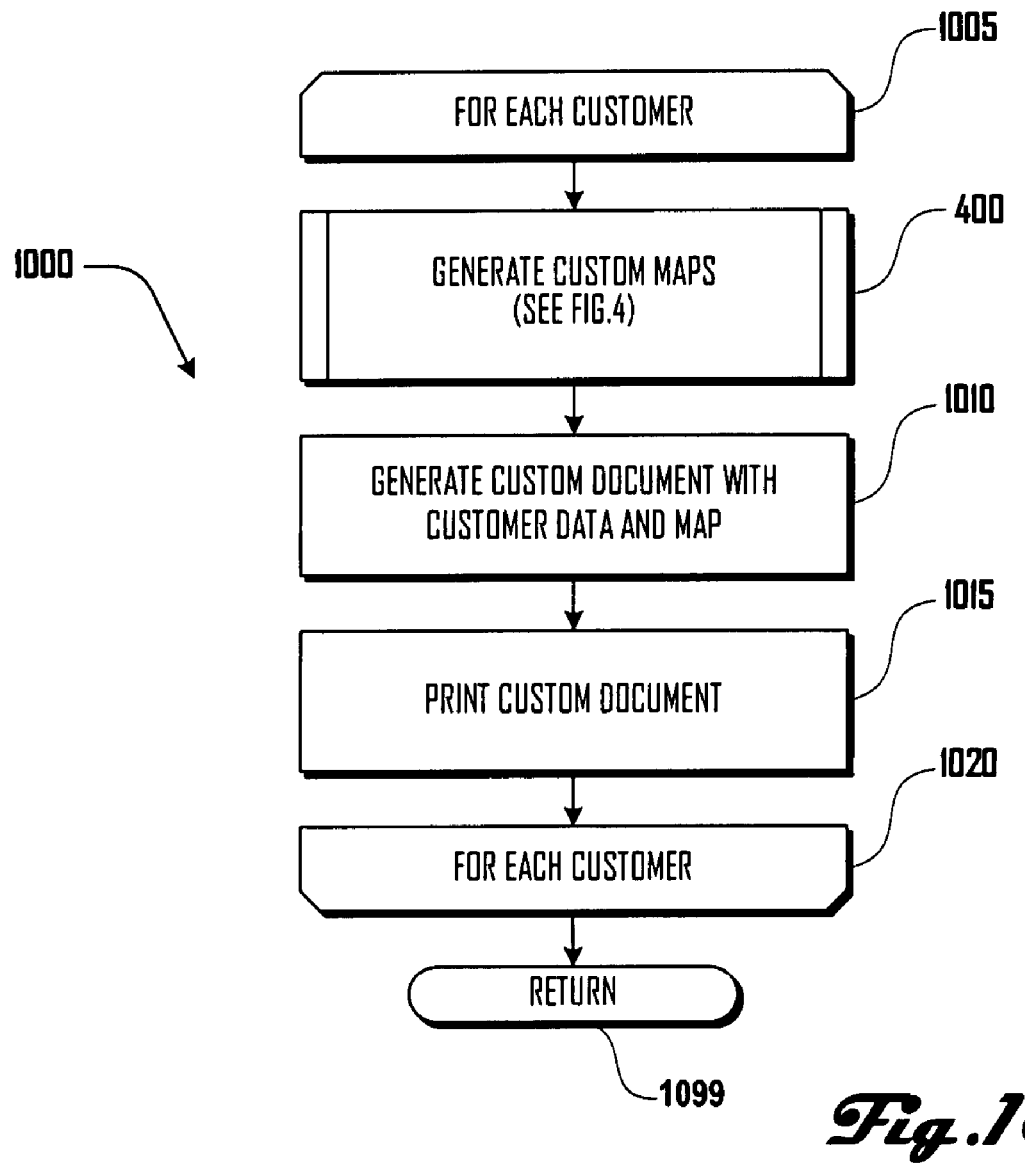
FIG. 10 illustrates a mail-merge subroutine in accordance with one embodiment.

FIG. 10 illustrates an exemplary mail merge process 1000. Processing begins at block 1005, wherein a customer is selected from a row or record in the structured data source 865. In sub-routine 400, a custom map for the customer is generated, as described above with reference to FIG. 4. The processing of sub-routine 400 may take place in an "add-on," "plugin," or other software module that interoperates with and extends the functionality of a standard word processing program. In block 1010, an output document is created for the customer. The output document may use the fixed text exactly as it appears in the template 860, but substitutes the placeholders in the template with appropriate values from the structured data source 865, further substituting the custom-generated map for each map placeholder. In block 1015, the resulting custom document is rendered into some form that can be delivered to the customer. In an exemplary embodiment, the custom document is printed to a printer 830 that is attached to the personal computer 800 that is running the mail merge process. In other embodiments, the custom document may be printed from a different computer, printed to a network printer, printed by a service bureau, or rendered to a format suitable for electronic delivery to the customer. At block 1020, processing cycles back to block 1005 until all rows or records in the structured data source 865 have been iterated through. The mail merge process 1000 ends at block 1099, which returns to the calling routine.

Although specific embodiments have been illustrated and described herein, it will be appreciated by those of ordinary skill in the art that a wide variety of alternate and/or equivalent implementations may be substituted for the specific embodiments shown and described without departing from the scope of the present invention. This application is intended to cover any adaptations or variations of the embodiments discussed herein.

What is claimed is:

1. A computer-implemented method of generating a plurality of custom marketing documents, the method comprising:
   obtaining, by a customization server, localized marketing campaign information for a branch location of a multi-branch business selected from a multi-branch automobile dealership, a multi-branch automobile repair facility, a multi-branch restaurant, a multi-branch home improvement store, a multi-branch grocery store, a multi-branch video rental store, a multi-branch bank, and a multi-branch credit union, said marketing campaign information including a targeting distance indicating a longest route that a typical customer will travel to patronize said branch location of said multi-branch business, said localized marketing campaign information being personalizable;
   querying, by said customization server, a customer information database to identify a plurality of prospective branch customers who reside in a region proximate to said branch location such that said plurality of prospective branch customers would travel a shorter distance than said targeting distance to reach said branch location;
   selecting, by said customization server, from said plurality of prospective branch customers a plurality of recently relocated prospects who have relocated during a recent time-period into a residence within said region proximate to said branch location;
   for each of said plurality of recently relocated prospects:
      generating, by said customization server, a custom map corresponding to a current one of said plurality of recently relocated prospects, said custom map including at least a portion of said region proximate to said branch location, wherein said custom map indicates said branch location and a residence corresponding to one of said recently-relocated prospective branch customers;
      determining, by said customization server, a travel route between said branch location and said residence, said travel route being shorter than said targeting distance;
      highlighting, by said customization server, said travel route on said custom map;
      generating, by said customization server, a custom marketing document specific to said current one of said plurality of recently relocated prospects and said branch location, said custom marketing document consisting of a first side and a second side, said first side including said marketing campaign information, personalized for said current one of said plurality of recently relocated prospects, said second side including said custom map with said highlighted travel route; and
      printing said custom marketing document to a variable data printing press.

2. The method of claim 1, wherein for each of said plurality of recently relocated prospects, said custom map is calculated at a first resolution, suitable for a computer display, the method further comprising adjusting said custom map to a second resolution, suitable for said variable data printing press.

3. The method of claim 1, further comprising for each of said plurality of recently relocated prospects: saving, by said customization server, said custom map to a database for reuse in generating a subsequent document for said current one of said plurality of recently relocated prospects and said branch location.

4. The method of claim 1, wherein said targeting distance is three miles.

5. A non-transient computer readable medium having stored thereon instructions that, when executed by a processor, configure the processor to perform the method of claim 1.

6. A computing apparatus comprising a processor and a memory having stored thereon instructions that, when executed by the processor, configure the apparatus to perform the method of claim 1.

* * * * *